United States Patent Office 3,127,510
Patented Mar. 31, 1964

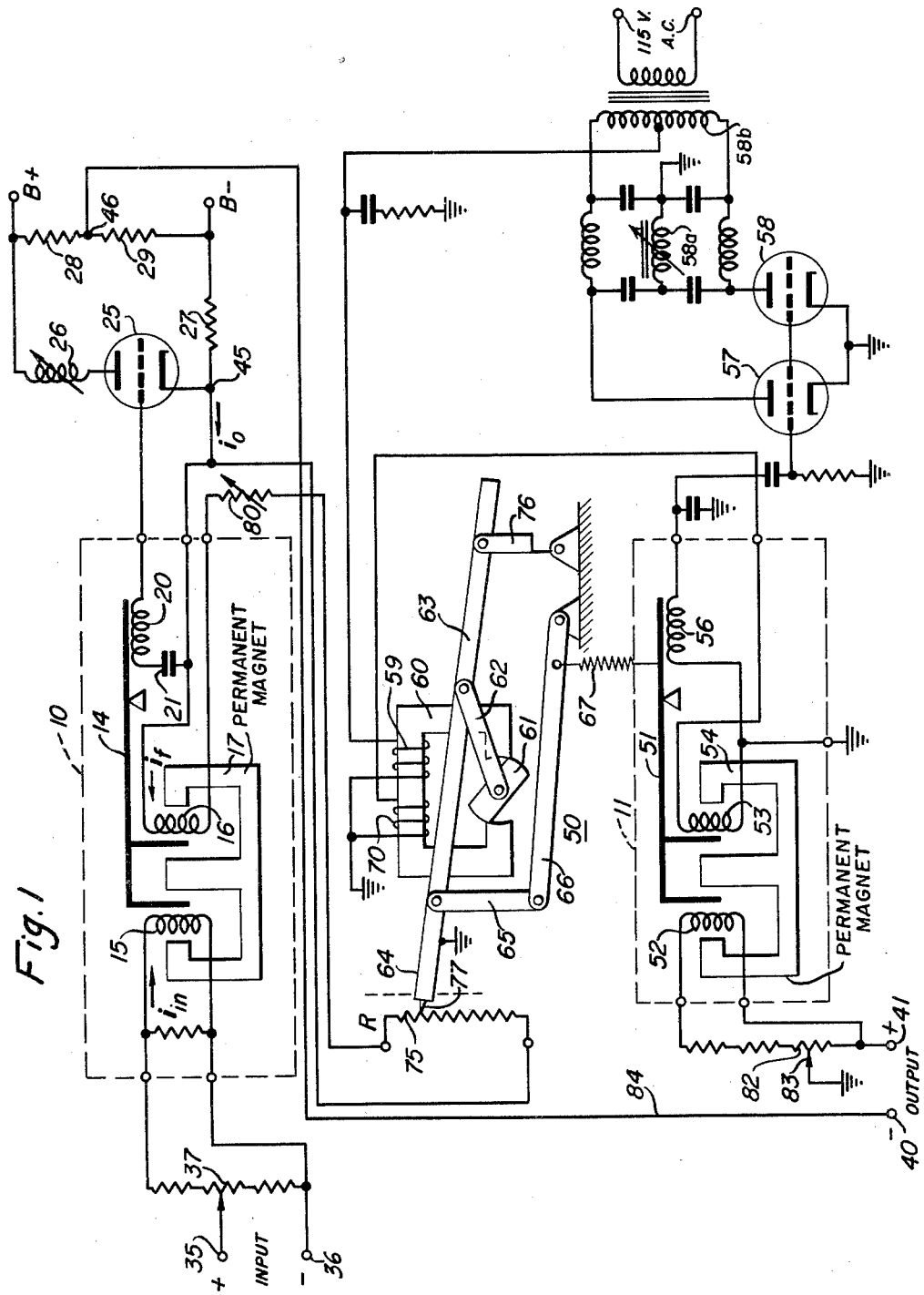

3,127,510
COMPUTER EMPLOYING ELECTROMECHANICAL BALANCE
Charles G. Roper, Fairfield, Edgar S. Gilchrist, Easton, and Frederick P. Finck, Jr., Fairfield, Conn., assignors to Robertshaw Controls Company, Richmond, Va., a corporation of Delaware
Original application June 1, 1956, Ser. No. 588,806, now Patent No. 2,957,627, dated Oct. 25, 1960. Divided and this application May 23, 1960, Ser. No. 30,800
7 Claims. (Cl. 235—193)

The present invention relates to computers, and, more particularly, to computers of the type employed to produce an electrical output signal which is related to one or more electrical input signals in accordance with a predetermined mathematical function. While the invention is of general utility, it is particularly suitable for use in and will be described in connection with an electronic process control system of the type described in a copending application of Charles G. Roper and Edgar S. Gilchrist, Serial No. 389,564, filed on November 2, 1953, now Patent No. 2,949,273 and assigned to the same assignee as the present invention.

This application is a division of our application Serial No. 588,806, filed June 1, 1956 and which has now issued as Patent No. 2,957,627.

In the system disclosed in the above identified copending application, a direct current signal is developed in accordance with the measured variable which is transmitted from the process area to the control area, at which point certain signal components necessary to produce proportional, rate and reset action may be introduced. However, in certain instances, it is desirable to modify the direct current input signal in accordance with some predetermined mathematical function. For example, it may be desirable to develop an output signal which is proportional to the product of two or more direct current input signals. On the other hand, it may, in some instances, be desirable to develop an output signal which is proportional to the square root of the input signal. However, such computing arrangements should be compatible with the overall process control system and be arranged to provide a standardized output signal which can be used to energize other component units of the system.

It is, therefore, an object of the present invention to provide a new and improved computer circuit wherein electromechanical balance units are employed to provide precise and accurate control of an output signal in accordance with a predetermined mathematical function.

It is another object of the present invention to provide a new and improved electronic computing arrangement wherein electromechanical balance units employing pivotally mounted beams are employed to develop an output signal which is proportional to the product of two standardized direct current input signals.

A further object of the present invention is to provide a new and improved computing arrangement wherein electromechanical balance units employing pivotally mounted beams are employed to develop a direct current output signal which is proportional to the square root of a direct current input signal.

The invention, both as to its organization and method of operation, together with further objects and advantages thereof, will best be understood by reference to the following specification taken in connection with the accompanying drawings, in which:

FIG. 1 is a schematic diagram of a computing arrangement embodying the principles of the present invention wherein an electrical output signal is developed which is proportional to the square root of an electrical input signal.

Referring now to FIG. 1, the computing arrangement therein illustrated comprises a first electromechanical balance unit indicated generally at 10 and a second electromechanical balance unit indicated generally at 11. The balance unit 10 includes a pivotally mounted beam 14 which carries at one end thereof an input coil 15 and a feedback coil 16, the coils 15 and 16 being positioned within a suitable magnetic field developed by means of a permanent magnet 17. Adjacent the other end of the beam 14 there is provided an oscillator coil 20 which is connected in series with the condenser 21 to the input circuit of an oscillator tube 25. The oscillator tube 25 and its associated anode load inductance 26 form one arm of a bridge circuit, the resistors 27, 28 and 29 forming the other three arms of the bridge. The terminals B+ and B− of this bridge circuit are energized by any suitable unidirectional voltage source which is preferably isolated from ground.

A direct current input signal is impressed upon the input terminals 35 and 36 and, by means of the potentiometer 37, a variable portion of this input signal may be impressed upon the input coil 15 so as to cause a corresponding deflection of the beam 14. The direct current input signal impressed upon the terminals 35 and 36 may be derived from any suitable preceding component of the control system wherein a direct current signal is produced, preferably in the standard range of .5 to 5.0 milliamperes, which varies in accordance with variations of the measured variable. For example, the direct current input signal may be developed from a differential pressure transmitter, of the type described in detail in the above identified copending application, which develops a .5 to 5.0 milliampere direct current signal which is proportional to the square of the actual flow. The computing arrangement shown in FIG. 1 is then employed to develop at the output terminals 40 and 41 thereof, a direct current output signal which is directly proportional to flow, that is a direct current output signal which is proportional to the square root of the direct current input signal impressed upon the terminals 35 and 36.

If the feedback coil 16 were connected directly across the equalizing terminals 45 and 46 of the above described bridge circuit, the beam 14 would be deflected in direct proportion to the input signal impressed upon the input terminals 35 and 36. However, in accordance with the present invention, the computing apparatus of FIG. 1 includes a recorder section indicated generally at 50 which, in addition to producing a record of the desired square root signal, functions to provide the desired square root function. More particularly, the recording section 50 includes a second electromechanical balance unit 11 which is provided with a pivotally mounted beam 51 which carries an input coil 52 and a feedback coil 53, the coils 52 and 53 being positioned within a magnetic field developed by the permanent magnet 54. Adjacent the other end of the beam 51, there is provided a control inductance 56 which is connected to the control grids of a pair of control tubes 57 and 58, these tubes being energized so as to produce an output signal across the winding 59 of a rotary solenoid 60. More particularly, the plate and grid circuits of the tubes 57 and 58 are interconnected to provide a full wave rectifier, and a push-pull oscillator, of which the variable inductance 58(a) comprises the tuning element. The center tap of the secondary winding 58(b) is connected to the winding 59 of the rotary solenoid 60. The rotor 61 of the rotary solenoid 60 is connected by means of the linkage elements 62 and 63 with a recording head 64 so as to produce a record of the square root output signal on a suitable chart (not shown) adjacent thereto. The linkage elements 65 and 66 are employed in conjunction with a calibrated spring 67 to apply a feedback force to the beam 51 in opposition to the force produced thereon by virtue of current flow through the input coil 52. In addition, the feedback coil 53 may be energized from a control winding 70 on the rotary solenoid 60. The elements described thus far in connection with the recorder section 50 may be substantially identical to corresponding elements described in detail in the above identified copending application and hence a detailed description of these elements herein is considered unnecessary. However, in accordance with the present invention, a resistance card or slide wire 75 is positioned adjacent the chart of the recorder and a contact 77 on the recorder element 63 is employed as a movable potentiometer arm which makes electrical contact with the resistance card 75 as the element 63 is moved, the contact 77 being grounded through the element 63 and the supporting mounting element 76.

In order to provide an output signal which is proportional to the square root of the direct current input signal, the equalizing terminals 45 and 46 of the above described bridge circuit are connected in circuit with the input coil 52 of the electromechanical balance unit 11 and also in circuit with the resistance card 75. Thus, the equalizing terminal 45 is connected through the feedback coil 16, a variable resistance 80, the lower portion of the resistance card 75 to the grounded contact 77, through the ground connection to the arm 83 of an input potentiometer 82 associated with the input coil 52 of the electromechanical balance unit 11, through a work circuit connected across the output terminals 40 and 41 and over the conductor 84 to the equalizing terminal 46. A portion of the output current thus flows through the input coil 52 of the recording section 50. However, the resistance card 75, which is varied in accordance with the position of the beam 51, is also connected in the output current circuit. The current flowing through the feedback coil 16 on the beam 14 must exactly balance the current flowing through the input coil 15 in response to the direct current input signal. Considering the total equalizing terminal current as $i_0$, the current flowing through the feedback coil as $i_f$ and the current flowing in the input coil 15 as the current $i_{in}$, we may write the following equation:

$$i_{in} = K_1 i_f \quad (1)$$

in which $K_1$ is a constant.

However, the feedback coil current is also determined by the resistance card 75, which may be termed R, so that $$i_f = K_2 i_0 R \quad (2)$$

in which $K_2$ is a constant.

Substituting for $i_f$ in Equation 1 we have, $$i_{in} = K_1 K_2 i_0 R \quad (3)$$

Since the resistance card R is controlled in accordance with the current $i_0$ which flows through the input coil 52 we have, $$i_{in} = K i_0^2 \quad (4)$$

in which K is a constant, or $$i_0 = K' \sqrt{i_{in}} \quad (5)$$

in which K' is a constant equal to $$\frac{1}{\sqrt{K}}$$

From the above mathematical derivation, it will be evident that the output current flowing through a work circuit connected to the output terminals 40 and 41 is a function of the square root of the input current flowing through the input coil 15 of the electromechanical balance unit 10. The output current supplied to the output terminals 40 and 41 may then be transmitted to any desired location and may be supplied to any suitable integrating device in the event that an indication or record of total flow is desired.

While there has been described what is at present considered to be the preferred embodiment of the invention, it will be understood that various modifications may be made therein which are within the true spirit and scope of the invention as defined in the appended claims.

We claim:

1. An electromechanical computer, comprising a first electromechanical balance unit having a pivotally mounted beam carrying an input coil which is positioned within a magnetic field, means for impressing a direct current input signal on said input coil, thereby to deflect said beam in accordance with said input signal, means including an oscillator responsive to movement of said beam for developing an output current, a second electromechanical balance unit having a pivotally mounted beam carrying an input coil which is positioned within a magnetic field, said second electromechanical balance unit including a variable resistance device, a second coil carried by the beam of said first electromechanical balance unit, and means connecting said second coil and said resistance device in circuit with said input coil of said second electromechanical balance unit.

2. An electromechanical computer for supplying current across a pair of output terminals, comprising a first electromechanical balance unit having a pivotally mounted beam carrying an input coil which is positioned within a magnetic field, means for impressing a direct current input signal on said input coil, thereby to deflect said beam in accordance with said input signal, an oscillator included in one arm of a bridge circuit, said bridge circuit having a pair of equalizing terminals, means for varying the output of said oscillator in accordance with the deflection of said beam, a feedback coil positioned on said beam and adapted to rebalance said beam, a second electromechanical balance unit having a pivotally mounted beam carrying an input coil which is positioned within a magnetic field, said second electromechanical balance unit, including a variable resistance device adjustable in accordance with the position of said beam, and means connecting said feedback coil, said resistance device and the input coil of said second electromechanical balance unit across the equalizing terminals of said bridge circuit and to the output terminals, thereby to supply a current flow across the output terminals proportional to the square root of said input signal.

3. An electromechanical computer for supplying current across a pair of output terminals, comprising a first electromechanical balance unit having a pivotally mounted beam carrying an input coil which is positioned within a magnetic field, means for impressing a direct current input signal on said input coil, thereby to deflect said beam in accordance with said input signal, an oscillator included in one arm of a bridge circuit, said bridge circuit having a pair of equalizing terminals, means for varying the output of said oscillator in accordance with the deflection of said beam, a feedback coil positioned on said beam and adapted to rebalance said beam, a second electromechanical balance unit having a pivotally mounted beam carrying an input coil which is positioned within a magnetic field, electronic means for developing an output signal proportional to the deflection of the beam of said second electromechanical balance unit, a movable element, means responsive to said output signal for rebalancing said beam and moving said element, a potentiometer having an adjustable contact, means for moving said contact in accordance with movement of said element, and means connecting said feedback coil, said resistance element and the input coil of said second electromechanical balance unit across the equalizing terminals of said bridge circuit and to the output terminals, thereby to produce a current flow across the output terminals proportional to the square root of said input signal.

4. An electromechanical computer, comprising a first electromechanical balance unit having a pivotally mounted beam carrying an input coil which is positioned within a magnetic field, means for impressing a direct current input signal on said input coil, thereby to deflect said beam in accordance with said input signal, an oscillator included in one arm of a bridge circuit, said bridge circuit having a pair of equalizing terminals, means for varying the output of said oscillator in accordance with the deflection of said beam, a feedback coil positioned on said beam and adapted to rebalance said beam, a second electromechanical balance unit having a pivotally mounted beam carrying an input coil which is positioned within a magnetic field, electronic means for developing an output signal proportional to the deflection of the beam of said second electromechanical balance unit, an output member, means responsive to said output signal for rebalancing said beam and moving said output member, a resistance device having an adjustable contact means for moving said contact in accordance with movement of said output member, and means connecting a portion of said resistance device in series with the input coil of said second electromechanical balance unit across the equalizing terminals of said bridge circuit.

5. An electromechanical computer, comprising a first electromechanical balance unit having a pivotally mounted beam carrying an input coil which is positioned within a magnetic field, means for impressing a direct current input signal on said input coil, thereby to deflect said beam in accordance with said input signal, means including an oscillator responsive to movement of said beam for developing an output current, a second electromechanical balance unit having a pivotally mounted beam carrying an input coil which is positioned within a magnetic field, a second coil carried by the beam of said first electromechanical balance unit, an output circuit including said second coil and the input coil of the second electromechanical balance unit for developing an output current, and means for varying the last named output current in response to pivotal movement of the beam of said second electromechanical balance unit.

6. The apparatus defined by claim 5 wherein the means for varying said last named output current includes a member movable in response to movements of the beam of said second electromechanical balance unit and a variable resistance operated by said member.

7. The apparatus defined by claim 6 wherein said variable resistance, said second coil and the input coil of the second electromechanical balance unit are connected in said output circuit in such manner that said last named output current is proportional to the square root of the input signal.

References Cited in the file of this patent
UNITED STATES PATENTS

| | | |
|---|---|---|
| 2,082,539 | Fischer | June 1, 1937 |
| 2,541,277 | Omberg et al. | Feb. 13, 1951 |
| 2,686,635 | Markson | Aug. 17, 1954 |